May 7, 1968
C. V. EVERETT ETAL
3,381,800
CONVEYOR OR ELEVATOR
Filed Oct. 26, 1966
2 Sheets-Sheet 1
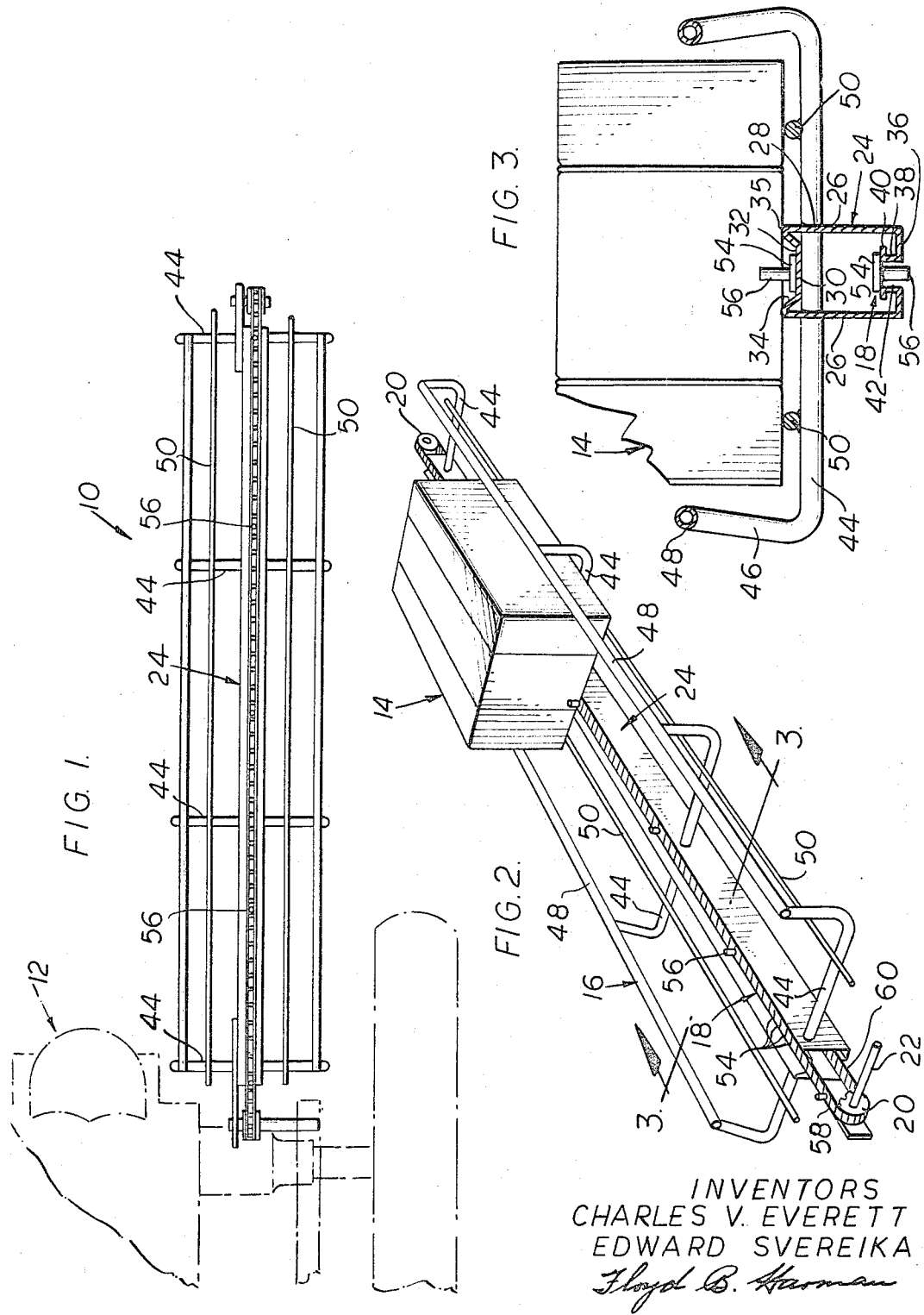
INVENTORS
CHARLES V. EVERETT
EDWARD SVEREIKA
Floyd B. Harman
ATTY May 7, 1968 C. V. EVERETT ETAL 3,381,800
CONVEYOR OR ELEVATOR
Filed Oct. 26, 1966 2 Sheets-Sheet 2
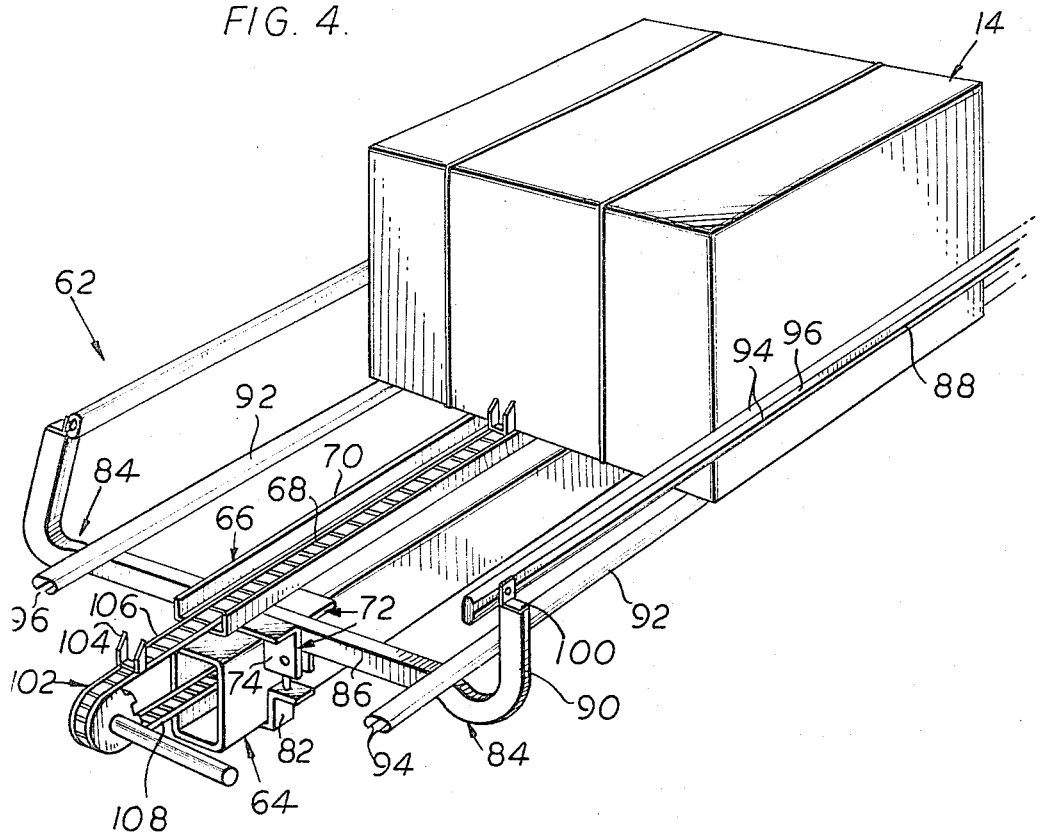
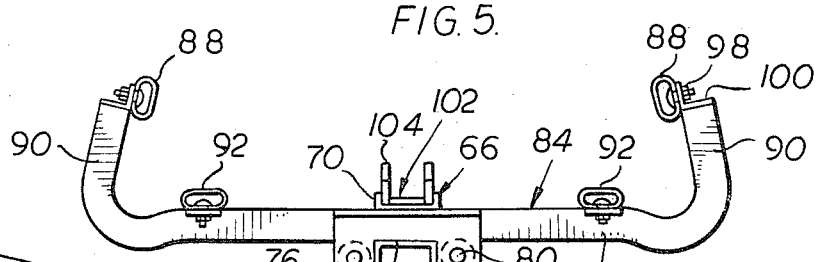
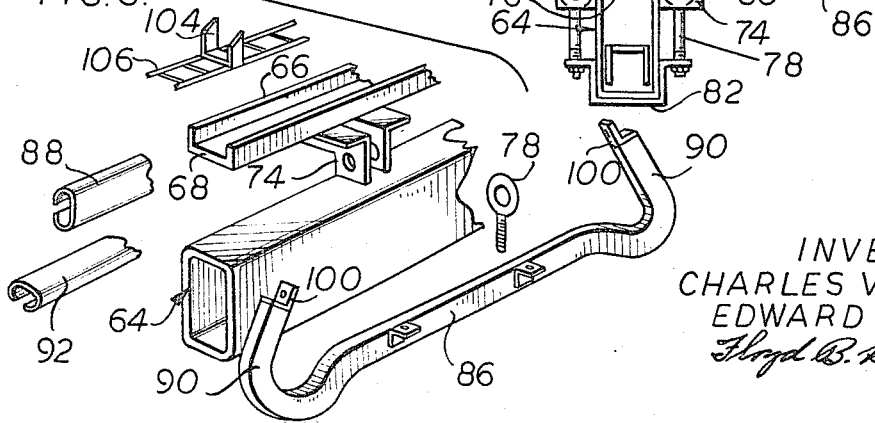
INVENTORS
CHARLES V. EVERETT
EDWARD SVEREIKA
ATTY

United States Patent Office 3,381,800
Patented May 7, 1968

3,381,800
CONVEYOR OR ELEVATOR
Charles V. Everett, Warrenville, and Edward Svercika, Chicago, Ill., assignors to International Harvester Company, Chicago, Ill., a corporation of Delaware
Filed Oct. 26, 1966, Ser. No. 589,715
4 Claims. (Cl. 198—204)

The present invention relates to a conveyor, or elevator.

The invention is applicable particularly to conveyors or elevators for handling large or bulky articles such as bales.

The conveyor or elevator is of the type utilizing a stationary framework and an endless chain therein, and an object of the invention is to provide such a conveyor in which the chain is enclosed or confined to a great degree, rendering it less subject to becoming snagged with other things or elements.

Another object is to provide a conveyor of the foregoing general type which is of extremely simple and strong construction.

An additional object is to provide a conveyor of the foregoing general character which in one form is of fixed construction, and in another form of demountable, knockdown or "do it yourself" character.

Other objects and advantages of the invention will appear from the following detail description taken in conjunction with the accompanying drawings in which:

FIGURE 1 is a plan view of a conveyor made according to the present invention, shown in association with a vehicle;

FIGURE 2 is a perspective view of the conveyor with a conveyed article thereon;

FIGURE 3 is a sectional view on an enlarged scale, taken at line 3—3 of FIGURE 2;

FIGURE 4 is a perspective view of a portion of a modified form of conveyor;

FIGURE 5 is an end view of the conveyor of FIGURE 4, but with the near end of the endless chain removed; and FIGURE 6 is a perspective, exploded view of certain of the elements of the conveyor of FIGURES 4 and 5.

Referring now in detail to the accompanying drawings, attention is directed first to FIGURES 1, 2 and 3 showing a first embodiment of the invention. The conveyor, indicated in its entirety at 10, is shown in association with a vehicle 12 which may any of various vehicles such as a tractor, baler, or other implement. The conveyor may be used for example for transporting articles from a baler (implement 12) to a receptacle or vehicle (e.g., a wagon or cart) and in such case it may extend generally horizontally or be inclined only slightly and serve as a conveyor, but the device is also applicable for lifting articles to a relatively greater height. An article 14 which may be a bale for example is shown on the conveyor. The conveyor is particularly adaptable to handling large articles, and the bale 14 may represent for example a bale of hay, a bale of cotton, a bag, etc.

The conveyor includes two main parts, a fixed structure frame 16 and an endless chain 18 trained on sprockets 20 suitably mounted in the frame and driven by suitable means (not shown) operating through a shaft 22.

The frame 16 includes a central main member or backbone 24 which in the present instance is generally tubular in form which can be economically formed by a rolling process or an extrusion process. This main member 24 supports all the remaining components and elements. In the present instance, this main member 24 includes side flanges 26, a web element 28 having a central depressed portion 30 providing a top supporting surface 32 between inclined side elements 34 forming ribs 35. The side flanges 26 are turned in at the bottom at 36, and then upwardly at 38 and again outwardly to form horizontal flanges 40 forming a bottom chain supporting surface. The elements 36 are spaced apart forming a slot 42 extending the length of the member 24.

Mounted in the central member 24 are a plurality of transverse elements or arms 44, preferably fitted in openings in the flanges 26 and secured in position as by welding, and extending outwardly where their outer ends are turned upwardly at 46, with side rails 48 secured thereto, these side rails extending the length of the frame. Supporting and guiding rods 50 are mounted on the arms 44 and secured thereto as by welding, which also extend the length of the frame. These rods 50 preferably are of such diameter that their upper surfaces lie in or near a common plane including the ribs 35 of the central member 24. The bale or other article 14 when on the conveyor therefore rests on the ribs 35 and the rods 50, and are thus relatively stably supported at a plurality of transversely spaced positions. The side guides 48 serve of course to prevent the bales from falling out of the conveyor.

The chain 18 may be of known kind and includes links 54 of relatively flat shape and upstanding grabbers or pushers 56 on selected and spaced ones of the links.

The chain 18 is arranged with its upper advance run 58 disposed on the upper supporting surface 32 of the portion 30 and the dimensions of the elements are such that the links 54 preferably are confined below the ribs 35 but the grabbers or pusher fingers 56 extend upwardly therebeyond to engage the conveyed articles 14. The lower return run 60 is generally within the interior of the tubular member 24, with the links 54 riding on the elements or flanges 40 and the grabbers 56 extending into the slot 42. The height of the elements 40 may be as desired, such as illustrated in FIGURE 3 in which the grabbers project slightly downwardly out of the slot, or they may be at a higher position in which the grabbers are entirely confined in the slot, and thus effectively in the tubular member 24.

The central member 24 thus provides great strength because of the substantial depth of the side flanges 26 and the chain 18 is to a great extent enclosed or confined in or close to the central member. The upper run 58 is held down on the surface 32 by the tension of the chain, when no conveyed articles 14 are thereon, and of course held down by gravity and by the articles 14 themselves. The return run 60 is substantially entirely confined and supported within the central member 24 preventing it from becoming entangled with other things. The overall construction of the conveyor, including the fixed frame 16 as well as the member 24 is of extremely simple and clean-cut design and construction, facilitating handling of the conveyor as well as handling of the conveyed articles and minimizing entanglement therein with other items, as well as resulting in unusual economy.

The conveyor 62 of FIGURES 4, 5 and 6 is basically similar to the first embodiment, including the same main components, but of such design and construction that it can be disassembled or knocked down and packed in a very compact arrangement. In the present instance the central member or backbone 64 may be of tubular construction with a continuous peripheral wall. Positioned above and supported indirectly by the central member 64 is a chain support member 66 extending the length of the conveyor and in the form a channel having a bottom web element 68 for directly supporting the chain, and side flanges 70. The chain support member 66 has secured to the underside thereof, as by welding, at spaced locations thereon, pairs of mounting elements 72 extending transversely and spaced apart longitudinally of the support member. These mounting elements may be in the form of angles with depending flanges 74 provided with aligned notches 76 for receiving the central member 64. Mounted in and between the flanges 74, at each end thereof, are eye bolts 78 supported by removable pins 80 in the flanges 74. A bottom clamp or yoke 82 engages the under side of the member 64 and, in cooperation with the eyebolts 78, secure the mounting elements 72, and thus the chain support member 66 firmly on the backbone 64.

Arms 84 are provided each having a central shank or bar portion 86 which is fitted between the mounting elements 72 and rests on the member 64. These arms 84 may be secured firmly in position by suitable means such for example as forming the notches 76 of such depth that the arms are gripped directly between the members 66 and 64.

Side guide rails 88 are mounted on upturned ends 90 of the arms 84, and support rods 92 are mounted on the bar portions 86 at positions spaced laterally outwardly from the central member 64. Both these rails 88 and rods 92 are demountably held in position, each being for example in the form of a channel or slotted tube having inturned flanges 94 defining a slot 96. Bolts 98 have heads within the channels and extend through the slots and are secured to the arms as by angles 100.

The chain 102 as in the previous case may be of any desired form including grabbers or pushers 104 and positioned with an upper advance run 106 in the member 66 and a lower return run 108 entirely within the central member 64.

The present form of conveyor of FIGURES 4, 5 and 6 includes the advantages of the first form, with the additional advantage that it is completely of demountable or knock-down form and can be packed in an extremely compact package with corresponding great saving in shipping costs as well as an advantage in flexibility in that the user may set it up in different locations relative to the buildings or other facilities in which it is to be used. In knock-down form, the central member or backbone 64 forms a separate element; the chain support member 66 with the mounting elements 72 thereon another elongated member; the arms 86 form other elongated members with minor transverse dimensions as determined by the upturned ends 90; the rails 88 and support rods 92 also form elongated members; and the chain 102 of course can be laid out in elongated form or rolled in coil form. These various separate components can be easily confined in a compact package of small transverse dimensions.

While we have disclosed herein certain preferred forms of the invention it will be understood that changes may be made therein within the spirit and scope of the appended claims.

We claim:

1. A conveyor of the general character disclosed comprising a substantially rigid, unitary frame defining nearly the full length of the conveyor, and a chain, the frame including a main central member of substantially tubular shape supporting the other elements of the frame, means forming a longitudinal chain supporting surface atop the tubular member and supported thereby, means forming upstanding ribs at the sides of said supporting surface, arms mounted on the tubular member and extending laterally therefrom with upturned outer ends extending upwardly beyond the tubular member, side guide rails secured to the upper extremities of said upturned outer ends, support rods on said arms spaced laterally from said chain supporting surface and having their upper surfaces lying substantially in a common plane with the upper edges of said ribs, the frame having a full open top extending substantially its full length, said chain having an upper advance run on said upper supporting surface and including flat links confined below the upper edges of said ribs and having grabbers extending thereabove, said chain having a lower return run substantially within said tubular member, the chain extending only a short distance beyond the ends of the frame, the tubular member defining substantially the lowermost limit of the frame throughout the length of the frame.

2. The invention according to claim 1 and including an upwardly opening channel member separate from said main central member mounted thereabove and forming said top chain supporting surface, means for demountably securing said channel member on the main central member, said arms being separate from the main central member and channel member and demountably secured to the main central member, and said side guide rails and supporting rods being demountably secured to said arms, whereby the main central member, channel member, arms, side guide rails and rods, together with said chain are all demountable from each other and capable of being compacted together in an elongated package of relatively small transverse dimensions.

3. The invention according to claim 2 wherein the means for securing the channel member to the main central member includes a plurality of securing means spaced longitudinally along the frame each mounting means including a pair of longitudinally spaced, transversely extending elements secured directly to the channel member, clamp means engaging the main central member and cooperating with said mounting elements, said arms being disposed between said mounting elements and clamped firmly between said channel member and main central member, said side guide rails and side rods being in the form of channels having longitudinal slots and bolt means extending through said slots and engaging the side marginal edges thereof and secured to said arms.

4. A conveyor of the general character disclosed comprising a substantially rigid, unitary frame defining nearly the full length of the conveyor, and a chain, the frame including a main central member generally in the form of channel having a top web forming a chain supporting surface and including a central depressed portion, the channel also including vertical side flanges extending upwardly beyond said chain supporting surface and forming ribs, the channel having bottom elements defining a slot therebetween, said bottom elements extending upwardly and having outturned terminal elements generally within the channel, and the lower return run of the chain having links riding on said terminal elements and grabbers extending downwardly in said slot to a position not materially beyond the lower-most limit of the channel member, said chain having an upper advance run on said upper supporting surface and including flat links confined below the upper edges of said ribs with said grabbers extending thereabove, arms mounted on the main central member and extending laterally therefrom with upturned outer ends extending upwardly beyond the main central member, side guide rails secured to the upper extremities of said upturned outer ends, support rods on said arms spaced laterally from said chain supporting surface and having their upper surfaces lying substantially in a common plane with the upper edges of said ribs, the frame having a full open top extending substantially its full length and the chain extending only a short distance beyond the frame.

References Cited

UNITED STATES PATENTS

| 1,534,334 | 4/1925 | Stutsman | 198—173 |
| 2,493,169 | 1/1950 | Speicher et al. | 198—204 |
| 2,769,525 | 11/1956 | Herscovitch | 198—173 X |
| 2,837,203 | 6/1958 | Reeser | 198—204 |
| 3,191,755 | 6/1965 | Timberlake | 198—128 |
| 3,280,962 | 10/1966 | Stone et al. | 198—204 |

EDWARD A. SROKA, *Primary Examiner.*

EVON C. BLUNK, *Examiner.*

R. J. HICKEY, *Assistant Examiner.*